(12) United States Patent
McCandless et al.

(10) Patent No.: US 10,909,550 B2
(45) Date of Patent: Feb. 2, 2021

(54) METHOD AND SYSTEM FOR PERFORMING TREND ANALYSIS OF THEMES IN SOCIAL DATA

(71) Applicant: Oracle International Corporation, Redwood Shores, CA (US)

(72) Inventors: Timothy P. McCandless, Boulder, CO (US); Mehrshad Setayesh, Lafayette, CO (US)

(73) Assignee: Oracle International Corporation, Redwood Shores, CA (US)

( * ) Notice: Subject to any disclaimer, the term of this patent is extended or adjusted under 35 U.S.C. 154(b) by 907 days.

(21) Appl. No.: 13/795,802

(22) Filed: Mar. 12, 2013

(65) Prior Publication Data

US 2014/0278769 A1  Sep. 18, 2014

(51) Int. Cl.
*G06Q 30/02* (2012.01)
(52) U.S. Cl.
CPC .............................. *G06Q 30/0201* (2013.01)
(58) Field of Classification Search
CPC ..................... G06Q 30/0202; G06Q 30/0201
USPC ....................................................... 705/7.31
See application file for complete search history.

(56) References Cited

U.S. PATENT DOCUMENTS

| 7,289,949 | B2 | 10/2007 | Warner et al. |
| 8,769,576 | B2 * | 7/2014 | Burkitt et al. ................. 725/40 |
| 8,775,429 | B2 * | 7/2014 | Choudhary et al. .......... 707/738 |
| 8,930,384 | B2 * | 1/2015 | Sommer ....................... 707/758 |
| 2003/0135499 | A1 | 1/2003 | Schirmer |
| 2008/0256093 | A1 | 10/2008 | Amitay |
| 2010/0211868 | A1 | 8/2010 | Karmarkar et al. |
| 2011/0066613 | A1 | 3/2011 | Berkman et al. |
| 2011/0072052 | A1 | 3/2011 | Skarin |
| 2011/0213785 | A1 | 9/2011 | Kristiansson et al. |
| 2011/0246378 | A1 | 10/2011 | Prussack et al. |
| 2012/0030210 | A1 | 2/2012 | Sankhla et al. |
| 2012/0047219 | A1 | 2/2012 | Feng et al. |
| 2012/0191644 | A1 | 7/2012 | Carter et al. |
| 2012/0215844 | A1 | 8/2012 | Ferlez et al. |
| 2012/0278387 | A1 | 11/2012 | Garcia |
| 2012/0290399 | A1 * | 11/2012 | England et al. ........... 705/14.66 |
| 2012/0324004 | A1 | 12/2012 | Le et al. |
| 2013/0018896 | A1 | 1/2013 | Fleischman et al. |
| 2013/0046579 | A1 | 2/2013 | Feiks |
| 2013/0054667 | A1 | 2/2013 | Mahajan |
| 2013/0097176 | A1 * | 4/2013 | Khader et al. ................ 707/748 |
| 2013/0179440 | A1 * | 7/2013 | Gordon ........................ 707/731 |

(Continued)

OTHER PUBLICATIONS

David Alfred Ostrowski et al, Semantic Social Network Analysis for Trend Identification, 2012 IEEE Sixth International Conference on Semantic Computing, pp. 178-185 (Year: 2012).*

(Continued)

*Primary Examiner* — Andre D Boyce
(74) *Attorney, Agent, or Firm* — Vista IP Law Group, LLP (57) ABSTRACT

Disclosed is an improved method, system, and computer program product for performing trend analysis of themes from social media data. Semantic analysis is performed on content that appear on social media sites. The results of the semantic analysis can be used to identify themes within the social media data over a period of time. Trend analysis is performed over the identified themes. An enterprise or business can more effectively market to the consumers based upon this knowledge of the consumers' interests.

27 Claims, 7 Drawing Sheets

(56) References Cited

U.S. PATENT DOCUMENTS

| | | | |
|---|---|---|---|
| 2013/0246430 A1* | 9/2013 | Szucs et al. | 707/738 |
| 2013/0275429 A1 | 10/2013 | York et al. | |
| 2014/0052718 A1 | 2/2014 | Waupotitsch et al. | |
| 2014/0136323 A1 | 5/2014 | Zhang et al. | |
| 2014/0280168 A1 | 9/2014 | Setayesh et al. | |
| 2014/0280525 A1 | 9/2014 | Mccandless et al. | |

OTHER PUBLICATIONS

Sungjoon Lee et al, A Semantic Network and Categorical Content Analysis of Internet and Online Media Research, The Open Communication Journal, 2009, 3, 15-28 (Year: 2009).*

Peter A. Gloor et al, Web Science 2.0: Identifying Trends through Semantic Social Network Analysis, 2009 International Conference on Computational Science and Engineering, pp. 215-222 (Year: 2009).*

Non-final Office Action dated Jan. 6, 2015 for related U.S. Appl. No. 13/795,699.

Final Office Action dated Aug. 14, 2015 for related U.S. Appl. No. 13/795,699.

Third Party Submission pursuant to 35 USC 122(e) and 37 CFR 1.290 filed on Sep. 23, 2014, in related U.S. Appl. No. 13/795,895.

Non-final Office Action dated Mar. 25, 2015 for related U.S. Appl. No. 13/795,895.

Final Office Action dated Oct. 8, 2015 for related U.S. Appl. No. 13/795,895.

Non-final Office Action dated Dec. 21, 2015 for related U.S. Appl. No. 13/795,699.

Final Office Action dated Aug. 4, 2016 for related U.S. Appl. No. 13/795,699.

Notice of Allowance and Fee(s) dated Apr. 25, 2016 for related U.S. Appl. No. 13/795,895.

Advisory Action dated Oct. 19, 2016 for related U.S. Appl. No. 13/795,699.

Notice of Allowance and Fee(s) dated Nov. 14, 2016 for related U.S. Appl. No. 13/795,699.

* cited by examiner

METHOD AND SYSTEM FOR PERFORMING TREND ANALYSIS OF THEMES IN SOCIAL DATA

BACKGROUND

Given the widespread availability and usage of the internet by consumers, many businesses have become interested in being able to effectively monitor the content and commentary provided by such consumers. Interactive websites such as social networks and blogs provide a wealth of useful information that can be advantageously used by a business.

It is possible to monitor the content of social media sites to identify the ranges of topics that are being commented about by users on the sites. By knowing about and understanding these topics, many businesses can then act upon that information to increase sales and revenue. It would be very desirable to allow the businesses to stay informed of actionable social networking content, for example, to identify potential customers and possible sales leads or to identify problematic situations that may require immediate involvement of customer service personnel.

Conventional approaches to monitoring social media content normally provide just a point-in-time snapshot of the topics at particular moments in time. These approaches identify, for example, specific topics that may have higher and/or lower volumes of commentary from individuals on the social media sites at the measured moment in time.

The problem with this conventional approach is that a mere snapshot in time analysis of social media data may create inaccurate analysis results, since the specific date/time at which the snapshots are taken may distort the results of the analysis. This can create results that overly emphasize less meaningful topics while ignoring more meaningful topics. In addition, this type of analysis may not be sufficient to provide a comprehensive-enough view of the actual topics that a business should concentrate upon. All of these problems serve to negatively affect the confidence that a business may have in the analysis results from social media.

Therefore, there is a need for an improved approach to perform analysis of social media data for businesses and enterprises.

SUMMARY

Embodiments of the present invention provide an improved system, method, and computer program product for performing trend analysis of themes from social media data. Semantic analysis is performed on content that appear on social media sites. The results of the semantic analysis can be used to identify themes within the social media data over a period of time. Trend analysis is performed over the identified themes. An enterprise or business can more effectively market to the consumers based upon this knowledge of the consumers' interests.

Other additional objects, features, and advantages of the invention are described in the detailed description, figures, and claims.

DETAILED DESCRIPTION

The present disclosure is directed to an approach for performing trend analysis of themes from social media data. Analysis is performed to identify the topics and subjects that appear within the social media data over a period of time. By performing the analysis over a period of time, this permits identification of trends that may exist with respect to the themes within the social media data.

This approach provides significant advantages over the alternate approach of just taking point-in-time snapshots of the social media data. Since the analysis is performed over a period of time, this avoids the problem of distorted results that may exist if the analysis is performed at a single moment in time. The results can be more easily used to identify meaningful topics that appear within the analyzed time frame. An enterprise or business therefore has greater confidence that the analyzed data can be more effectively used to market to the consumers based upon this knowledge of the consumers' interests.

Figure 1:
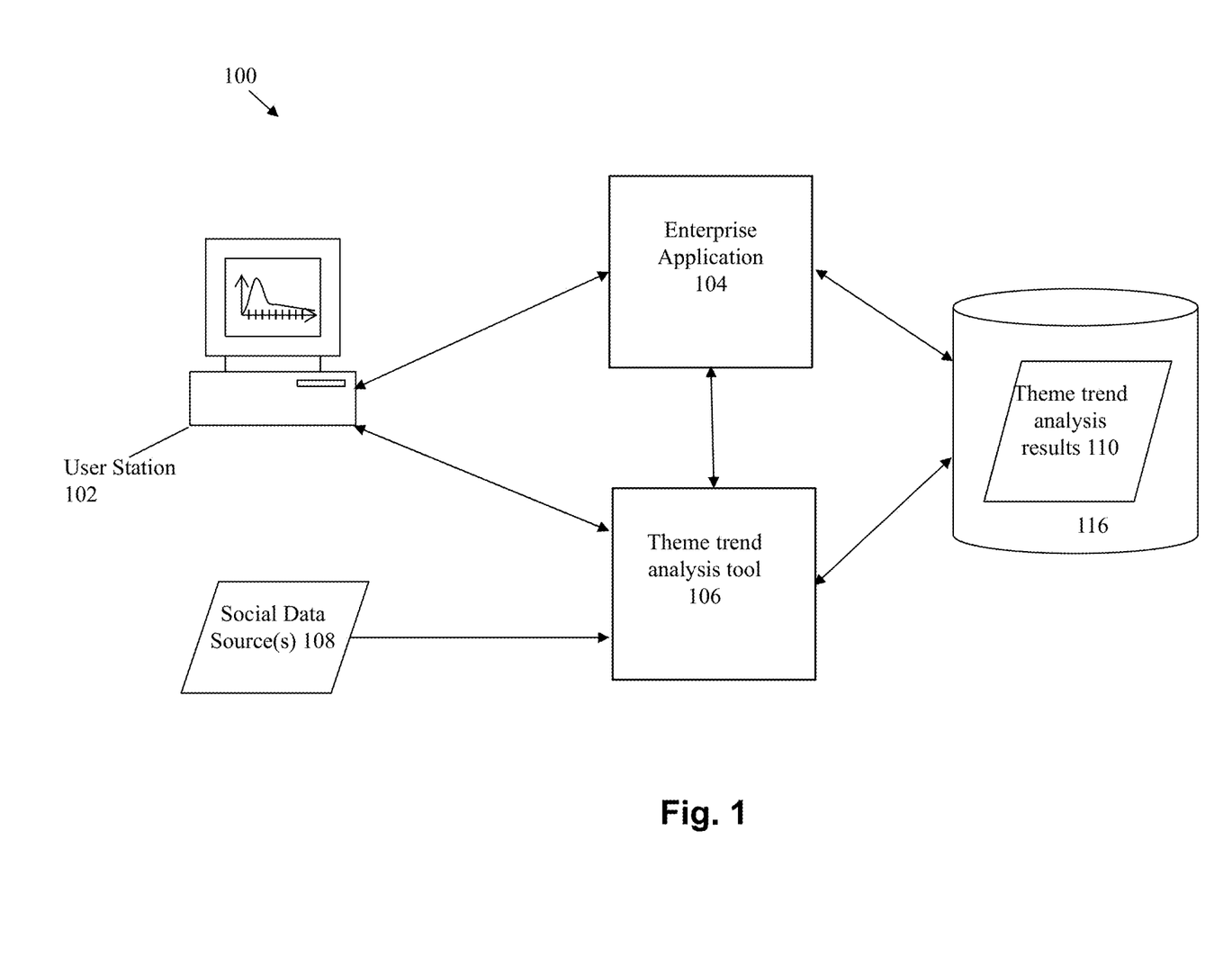
FIG. 1 illustrates a system to implement trend analysis over social media data according to embodiments of the invention.

FIG. 1 illustrates an example system 100 which may be employed in some embodiments of the invention to implement trend analysis. The system includes one or more users at one or more user stations 102 that operate the system. The user station 102 comprises any type of computing station that may be used to operate or interface with the applications in the system. Examples of such user stations 102 include, for example, workstations, personal computers, or remote computing terminals. The user station 102 comprises a display device, such as a display monitor, for displaying a user interface to users at the user station. The user station 102 also comprises one or more input devices for the user to provide operational control over the activities of the system 100, such as a mouse or keyboard to manipulate a pointing object in a graphical user interface to generate user inputs to the enterprise application 104 and/or trend analysis tool 106.

The trend analysis tool 106 receives data for a range of times from one or more online social data sources 108. Such social data sources 108 include, for example, websites such as a social network, blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types.

Semantic analysis and clustering are performed upon the social media data to identify semantic clusters within the data. The semantic clusters correspond to themes within the social media data. The themes are tracked over a period of time to detect trends, if any, that exist for the identified themes.

Actionable data can then be identified based upon the theme trend analysis results. The actionable data is provided to an enterprise application 104. The enterprise application 104 comprises any business-related application that provides visibility and control over various aspects of a business. Such enterprise/business applications can include, without limitation, customer relations management ("CRM") applications, enterprise resource planning ("ERP") applications, supply chain management applications, and other applications dealing with various finance, accounting, manufacturing, human resources, and/or distribution functions, to name but a few examples. Exemplary enterprise application suites include, without limitation, Oracle Fusion, Oracle eBusiness Suite and JD Edwards Enterprise One, all of which are available from Oracle Corporation of Redwood Shores, Calif.

For the purposes of explanation, one or more embodiments are illustratively described with reference to CRM applications. It is noted, however, that the invention may be applied to other types of enterprise applications as well, and is not to be limited to CRM applications unless explicitly claimed as such.

The theme trend analysis results 110 are stored into a database in a computer readable storage device 116. The computer readable storage device 116 comprises any combination of hardware and software that allows for ready access to the data that is located at the computer readable storage device. For example, the computer readable storage device 116 could be implemented as computer memory operatively managed by an operating system. The computer readable storage device could also be implemented as an electronic database system having storage on persistent and/or non-persistent storage.

Figure 2A:
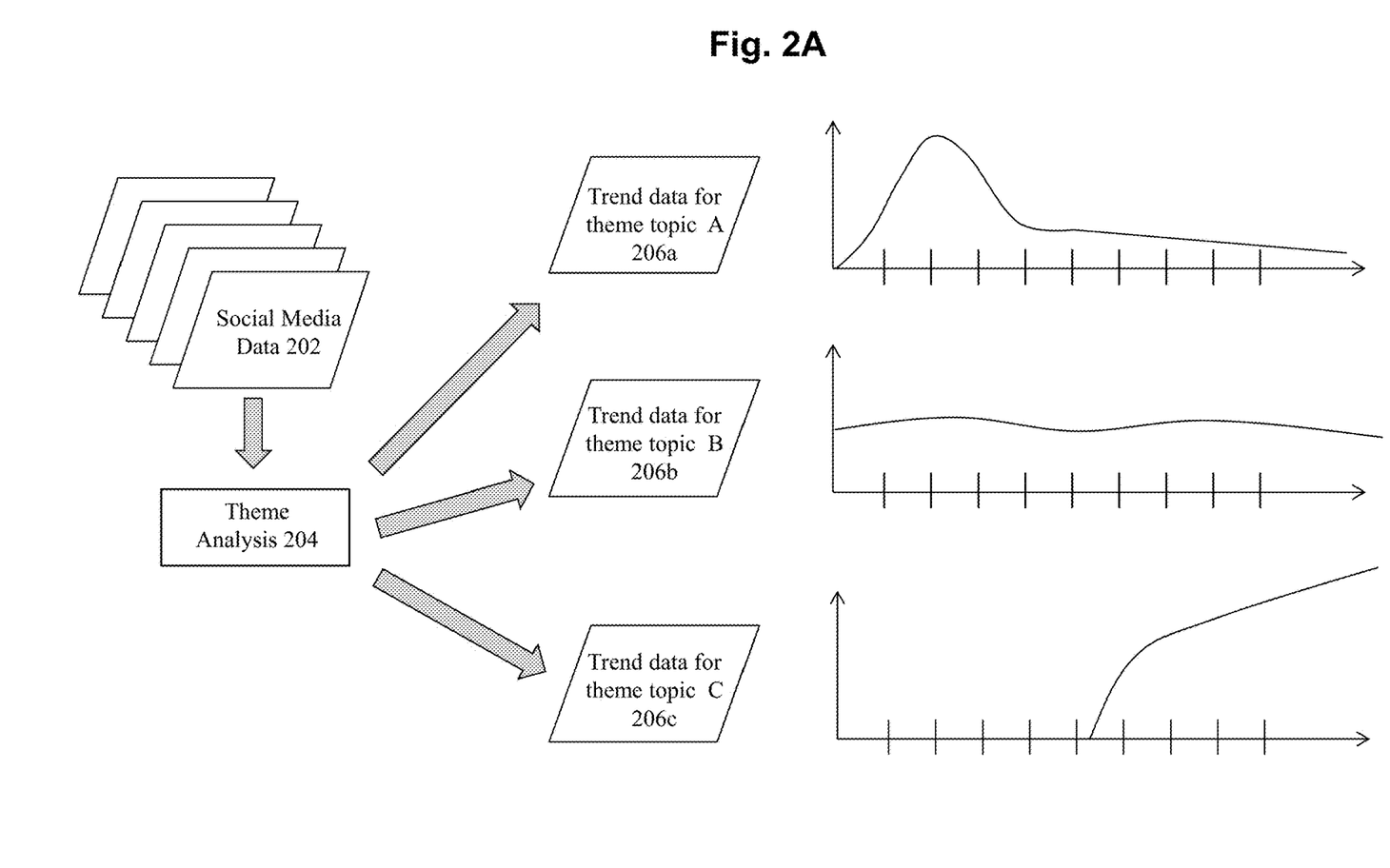
FIGS. 2A and 2B illustrate trend analysis over social media data according to embodiments of the invention.

FIG. 2A shows an illustrative example of how theme trending can be used to generate analysis results. The process begins by acquiring social data 202 from one or more social network systems, e.g., from public blog sites, twitter messages, RSS data, and social media sites such as Facebook. In some embodiments, the data 202 that is received for processing may include non-social data.

Theme analysis 204 is performed on the data 202, e.g., by performing semantic analysis upon the received data. For example, latent semantic analysis (LSA), an advanced form of statistical language modeling, can be used to perform semantic analysis upon the author writings. This permits the system to understand the contextual and semantic significance of terms that appear within the social data. For example semantic analysis can be used to understand the difference between the term "Galaxy" used in the author writing for astronomy content, and "Galaxy" in the author writing to refer to the name of a professional soccer team.

Performing semantic analysis along with classification to the social media data permits the system to create and identify themes, and to cluster together like-minded messages, topics, conversations, and content from the authors. This action is performed by categorizing the subjects of the author writings.

In some embodiments, the social data content is subject to semantic filtering to reduce the excess "noise" of irrelevant data. Semantic filtering is a mechanism that is provided to minimize miss-categorizations of the social data. Much of the social data is likely to contain content which is of very little interest. Semantic filtering is used to remove the irrelevant material from the social data to reduce the occurrence of false positives, false negatives, and inappropriate responses/rejections within the actionable data. This permits the resulting data to be more relevant and accurate.

The theme data is tracked over a period of time to form the trend data for the identified themes. The trend data can be used to understand the changes that occur with respect to the topics and subjects that interests individuals that access social media. The theme trends can be displayed to allow for visualization of the trends that exist for themes.

In the illustrative example of FIG. 2A, the trend data 206a for topic A indicates a very high spike in interest during the early portion of the timeframe, followed by an almost immediate sharp drop-off, and then much lowered interest levels for the substantial last portion of the analyzed timeframe. For topic B, the trend analysis 206b shows a medium level of interest that is stable throughout the entire timeframe. For topic C, the trend analysis 206c shows an abrupt origination of interest at the middle portion of the timeframe, with a high level of interest that increases throughout the latter portion of the timeframe.

It is of great interest to businesses and other enterprises to know about such trends that exist for topics within the social media data—to understand which themes are stable, which ones correspond to surges in interest by consumers, and which ones have very little or decreasing interest. This permits businesses to more accurately direct resources and marketing efforts at topics that deserve the most company resources and marketing attention.

Early identification of emerging themes could also be a critical factor between creating a marketing success or falling behind the competition. In addition, to the extent the theme trends pertain to customer service issues (e.g., product defects or services interruptions/problems), early identification of theme trends could provide a way for businesses to address customer relations issues before they become a widespread problem. For example, a service outage may cause a trending increase in comments about the business that provides the service. By identifying this trend, the business can take immediate action to correct the service outage at an early stage, thereby avoiding a more widespread public relations problem.

Trend analysis can be performed over multiple aspects of the social media data. For example, sentiment analysis is another type of analysis that can be performed over the social data. Sentiment analysis identifies the sentiments of individuals with regards to the analyzed topics. This type of analysis permits an organization to understand the positive and/or negative opinions and feelings about various topics in social media. Similar to the above discussion of theme trend analysis, sentiment trend analysis can be performed to identify sentiment trends in social media.

Figure 2B:
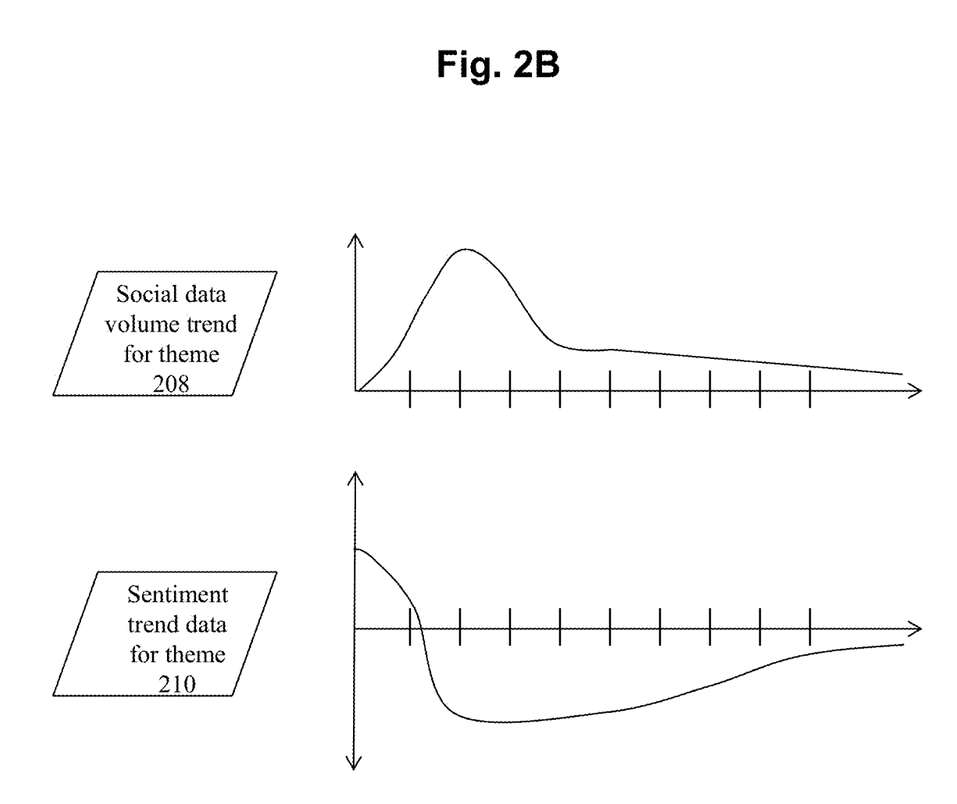

The trend analysis data for multiple aspects of social media can be used in conjunction with one another to perform correlation analysis. For example, as shown in FIG. 2B, the theme trend data 208 can be analyzed in conjunction with the sentiment trend data 210 for the same timeframe. In this illustrative example, it can be seen that there is a spike in interest for a given theme early in the analyzed timeframe. At the exact point in time of the spike in interest in the theme, the sentiment trend data shows a sharp drop in sentiment for the same topic, moving from a positive opinion to a negative opinion. The trend analysis shows that the negative opinion remains throughout that entire timeframe. This example analysis shows an interesting moment-in-time correlation between a spiked interest in a topic and a steep drop in sentiment for that topic (e.g., possibly based on an event that was viewed negatively by the public), along with the longer term effects of that correlation.

For example, consider the typical business that produces a marketing/advertisement campaign. It would be of great interest to understand the nature of the trends pertaining to that campaign, to discover in a coordinated way whether the campaign has any effect on increasing publicity (e.g., whether there are any increasing theme trends for the topics of the campaign) and whether the campaign creates any positive image improvements (e.g., whether there are increasing sentiment trends for the campaign topic). If either of these two trends are deficient, then the business can take steps early in the campaign to address possible issues about its effectiveness, or even kill the campaign if the sentiments are overly negative.

Figure 3:
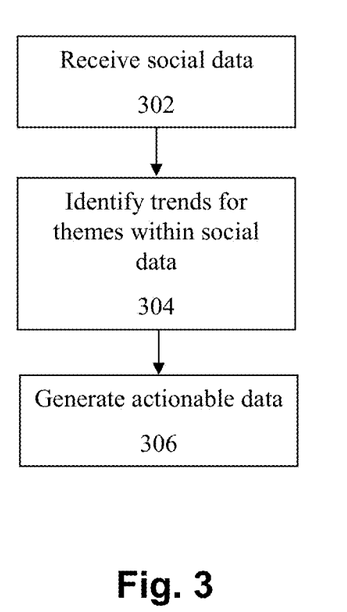
FIG. 3 illustrates a flowchart of an approach to perform trend analysis according to embodiments of the invention.

FIG. 3 shows a high-level flowchart of an approach to implement some embodiments of the invention. At 302, social data is received for analysis. As noted above, the social data may be received from any suitable source of the data, e.g., one or more social network systems, such as public blog sites, twitter messages, RSS data, and social media sites such as Facebook. The analyzed data may also be received from non-social sources.

At 304, theme trend analysis is performed on the social media data. Semantic analysis and classification are performed to identify themes within the social media data. The theme analysis is performed for data that is gathered from a period of time. The analysis results establish trend data for the analyzed timeframe. The analysis may be performed for multiple aspects of the social data, e.g., for both theme trending and sentiment trending.

At 306, actionable data is generated for those authors. The actionable data correspond to areas of analytical importance with respect to the specific organizations that will be consuming the results of the system. For example, a business may seek to use the system to analyze trends to (1) identify sales opportunities; (2) identify customer relations issues and dissatisfied customers; (3) identify effectiveness of marketing materials and advertisements; and (4) identify areas to focus upon for marketing activities. If these are the business' goals, then at least some of the analysis results will, in some embodiments, correspond to identification of the content that pertain to these categories, e.g., the information can be used to direct product, service, or customer satisfaction issues to the appropriate customer relations department.

The actionable data can be processed using any suitable processing mechanism. In one embodiment, automated processing is performed using a rules and workflow engine. In this approach, a set of rules is provided in a rulebase, where the rules identify how the actionable data should be handled and directed within the organization. The system then dispatches and/or creates the appropriate messages to be sent to destinations within the enterprise. For example, opportunity messages can be sent to a CRM system, where a record is automatically created and/or process in the system for the sales lead. Product data and comments can be provided to ecommerce products and groups. The present invention can therefore be used to provide a framework for integrating a corporate infrastructure to analysis results from the author profiling tool.

Figure 4:
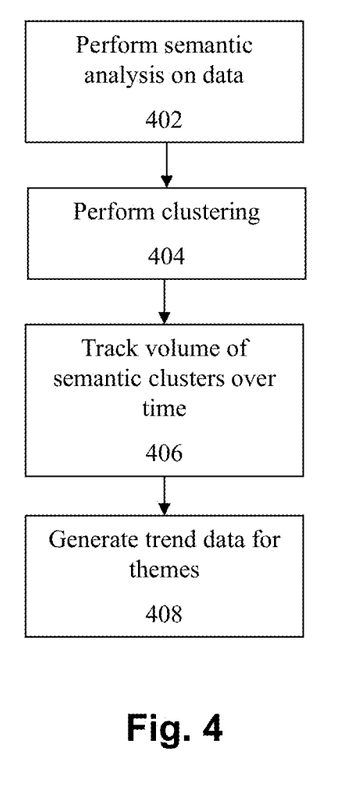
FIG. 4 illustrates a flowchart of an approach for performing semantic analysis to generate trend data according to embodiments of the invention.

FIG. 4 shows a flowchart of an approach to generate trend analysis data. At 402, semantic analysis, classification, and filtering are performed upon the social data. This permits the system to understand the contextual and semantic significance of terms that appear within the social data. Filtering may be applied to remove irrelevant data from the analysis.

At 404, clustering is performed to identify specific themes within the social data. The themes are identified based upon the topics and subjects revealed from the semantic analysis and classification process. Therefore, categorization is performed upon the subjects of the author writings.

At 406, the theme data is reviewed over a period of time to identify trends in the data. Any suitable timeframe may be used for the analysis, from very short timeframes to very long timeframes. In some situations, a long term timeframe may be desirable to understand long terms trends for certain topics. In other cases, it may be desirable to analyze timeframes that are very short, e.g., to start analysis at the beginning of a TV show to identify trends in themes by consumers that watch the TV show, which can be used to direct what is shown towards the latter part of the show itself or the commercial advertisements. At 408, the analysis results are generated for the analyzed timeframe.

In one embodiment, the above analysis may be performed in the context of a business' selected topics. In this approach, the business will identify the specific topics that are to be tracked for the analysis. Sematic analysis over the selected timeframe is performed to generate the trend data for the topics.

Figure 5:
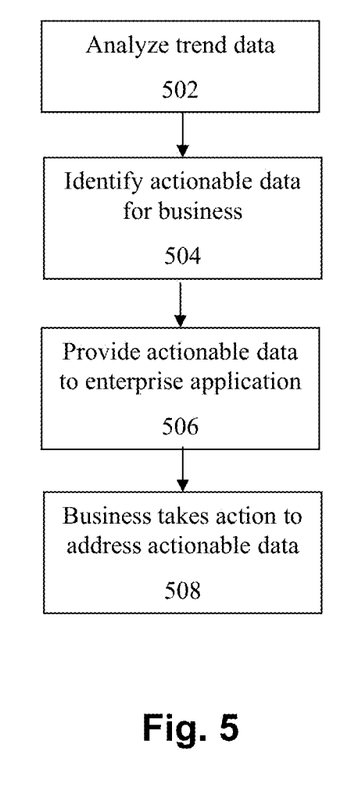
FIG. 5 illustrates a flowchart of an approach for taking actions using trend analysis data according to embodiments of the invention.

FIG. 5 shows a flowchart of a process for taking actions in response to the theme trend analysis. At 502, the theme trend data is analyzed, e.g., by receiving the analysis results from performing the process of FIG. 4. The trend data is analyzed to identify topics that may be of interest to a business or enterprise, e.g., to identify trends for themes that pertain to products or services provided by the business or its competitors.

At 504, actionable data is identified, e.g., to identify actionable items that are revealed from the theme trend data. As noted above, a business may seek to use the system to analyze trends pertaining to, for example, (1) identify sales opportunities; (2) identify customer relations issues and dissatisfied customers; (3) identify effectiveness of marketing materials and advertisements; and (4) identify areas to focus upon for marketing activities.

The actionable data is provided at 506 to an enterprise application, where appropriate messages and/or data entries are created and/or sent to destinations within the enterprise. For example, opportunity messages can be sent to a CRM system, where a record is automatically created and/or process in the system for the sales lead. Product data and comments can be provided to ecommerce products and groups.

At 508, the business can then take steps to address the actionable data, where the actionable data is used to direct product, service, or customer satisfaction issues to the appropriate personnel and systems to address the actionable data. For example, the trend data can be used to validate or identify problems with marketing campaigns. Therefore, the trend data relating to the marketing campaign may be used as a feedback mechanism to tune the marketing campaign to improve its effectiveness. The trend data can also be used to identify customer relations issues, where the actionable data comprises tickets that are automatically sent to a customer service department for processing.

Therefore, what has been described is an improved system, method, and computer program product for performing trend analysis of themes from social media data. Semantic analysis is performed on content that appear on social media sites. The results of the semantic analysis can be used to identify themes within the social media data over a period of time. Trend analysis is performed over the identified themes. An enterprise or business can more effectively market to the consumers based upon this knowledge of the consumers' interests.

System Architecture Overview

Figure 6:
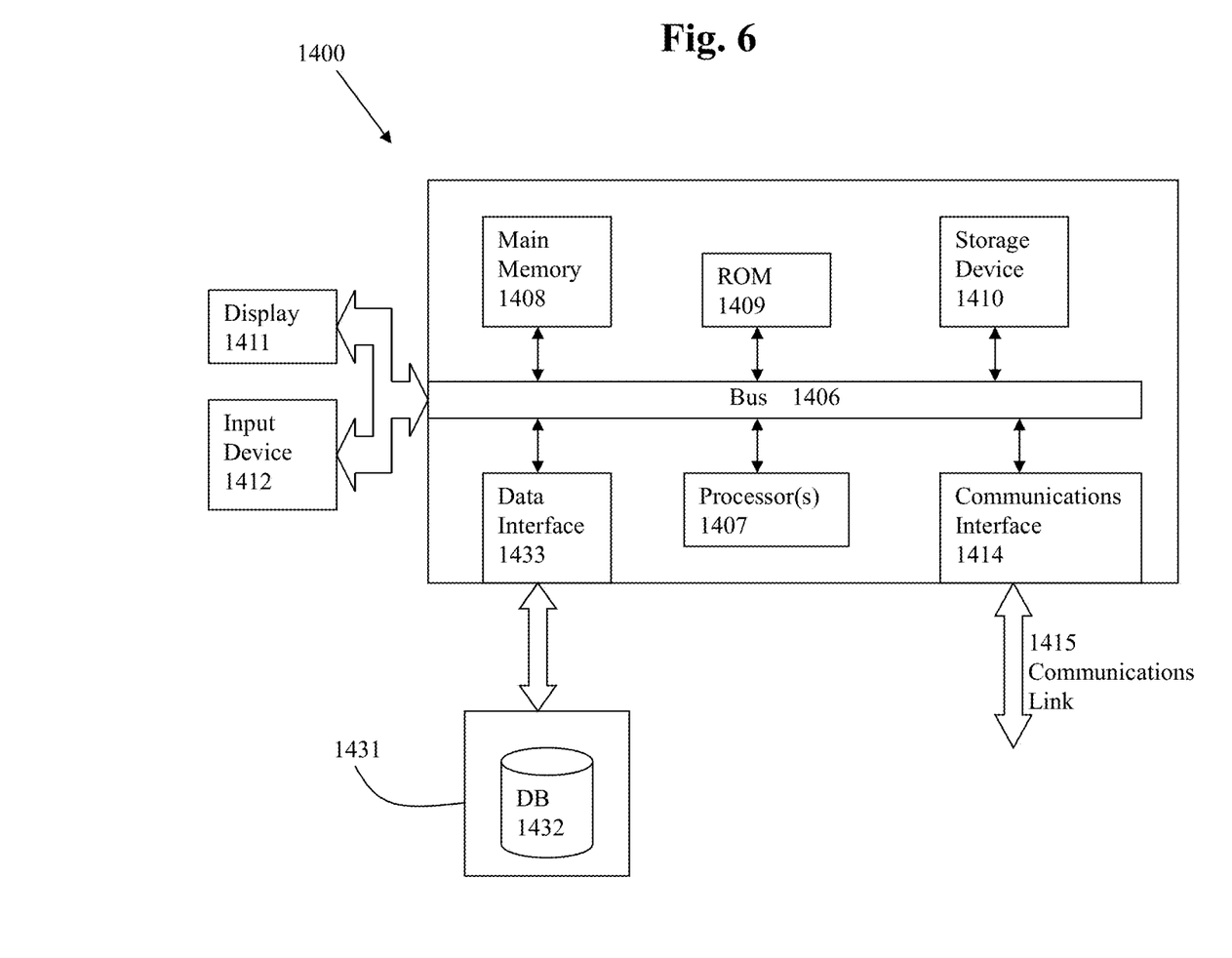
FIG. 6 depicts a computerized system on which an embodiment of the invention can be implemented.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for analyzing social media data to identify one or more trends and perform trend analysis on a portion of the social media data representing a range of time, the method comprising:

analyzing a portion of the social media data using an analysis unit, the analysis unit being communicatively coupled to receive inputs from one or more online social data sources and to provide analysis outputs to a workflow engine, the analysis unit generating trend analysis for the portion of the social media data, the analysis of the portion of the social media data performed by a process comprising:
    receiving social media data from the one or more online social data sources transmitted over one or more electronic communication links, the social media data representing a first range of time,
    performing latent semantic analysis on a portion of the social media data to identify themes within the social media data, the portion of the social media data comprising some or all of the social media data and representing a second range of time,
    performing semantic filtering to remove content from within the social media data resulting in a reduction of the social media data that is to be clustered,
    clustering at least some of the portion of the social media data into one or more clusters by classifying the social media data based on at least the themes identified as a result of the latent semantic analysis, and
    performing trend analysis on data from the one or more clusters over the second range of time, the trend analysis comprising both:
        (1) tracking a volume of the data from the one or more clusters over the second range of time, and
        (2) performing sentiment analysis on the volume of the data from the one or more clusters over the second range of time;
processing trend analysis results using a workflow engine, the workflow engine processing the trend analysis results using a set of rules provided in a rulebase, the trend analysis results processed by:
    receiving the trend analysis results from the analysis unit transmitted over one or more electronic communication links,
    identifying one or more items based at least in part on the trend analysis results; and
    automatically processing at least some of the one or more items by identifying a first rule from the set of rules for determining whether to create an electronic message, the electronic message being sent over the one or more electronic communication links to a specific destination based at least on a second rule from the set of rules, the second rule corresponding to identifying the specific destination for the electronic message.

2. The method of claim 1, wherein the trend analysis comprises theme analysis corresponding to consumer interest over the second range of time and determining the volume and sentiment of the data from the one or more clusters over the second range of time.

3. The method of claim 1, wherein the trend analysis comprises sentiment analysis for a topic over the second range of time.

4. The method of claim 3, in which the trend analysis further comprises theme analysis for the topic, and sentiment analysis and the theme analysis are reviewed in conjunction with each other.

5. The method of claim 1, in which the latent semantic analysis analyzes contextual and semantic significance of terms that appear within the social media data.

6. The method of claim 1, wherein semantic filtering further comprises reducing at least one of an occurrence of false positives, false negatives, inappropriate responses, or inappropriate rejections within the one or more items.

7. The method of claim 1, wherein the one or more items are supplied to an enterprise software system and the set of rules identifying how repective items of the one or more items should be handled or directed within an organization.

8. The method of claim 7, wherein the enterprise software system comprises at least one of a customer relations management ("CRM") application, enterprise resource planning ("ERP") application, and supply chain management application.

9. The method of claim 1, further comprising
displaying the trend analysis results within a graphical user interface on a display screen;
receiving a user input to manipulate a pointing object in the graphical user interface;
filtering to reduce occurrences of false positives, false negatives, irrelevant data or inappropriate responses, the filtering comprising at least semantic filtering;
storing the trend analysis results in an electronic database on one or more persistent computer readable storage devices;
wherein latent semantic analysis analyzes contextual and semantic significance of terms that appear within the social media data;
wherein volume analysis and sentiment analysis are reviewed in conjunction with each other; and
wherein the workflow engine is part of an enterprise software system comprising at least one of a customer relations management application, enterprise resource planning applications, and a supply chain management application, the one or more items comprising at least one of identification of sales leads, identification of customer relations issues, or identification of dissatisfied customers.

10. A computer program product embodied on a non-transitory computer readable medium, the computer readable medium having stored thereon a sequence of instructions which, when executed by a processor causes the processor to execute a method for analyzing social media data to identify one or more trends and perform trend analysis on a portion of the social media data representing a range of time, the method comprising:
analyzing a portion of the social media data using an analysis unit, the analysis unit being communicatively coupled to receive inputs from one or more online social data sources and to provide analysis outputs to a workflow engine, the analysis unit generating trend analysis for the portion of the social media data, the analysis of the portion of the social media data performed by a process comprising:
receiving social media data from the one or more online social data sources transmitted over one or more electronic communication links, the social media data representing a first range of time,
performing latent semantic analysis on a portion of the social media data to identify themes within the social media data, the portion of the social media data comprising some or all of the social media data and representing a second range of time,
performing semantic filtering to remove content from within the social media data resulting in a reduction of the social media data that is to be clustered,
clustering at least some of the portion of the social media data into one or more clusters by classifying the social media data based on at least the themes identified as a result of the latent semantic analysis, and
performing trend analysis on data from the one or more clusters over the second range of time, the trend analysis comprising both:
(1) tracking a volume of the data from the one or more clusters over the second range of time, and
(2) performing sentiment analysis on the volume of the data from the one or more clusters over the second range of time;
processing trend analysis results using the workflow engine, the workflow engine processing the trend analysis results using a set of rules provided in a rulebase, the trend analysis results processed by:
receiving the trend analysis results from the analysis unit transmitted over one or more electronic communication links,
identifying one or more items based at least in part on the trend analysis results; and
automatically processing at least some of the one or more items by identifying a first rule from the set of rules for determining whether to create an electronic message, the electronic message being sent over the one or more electronic communication links to a specific destination based at least on a second rule from the set of rules, the second rule corresponding to identifying the specific destination for the electronic message.

11. The computer program product of claim 10, wherein the trend analysis comprises theme analysis corresponding to consumer interest over the second range of time and determining the volume and sentiment of the data from the one or more clusters over the second range of time.

12. The computer program product of claim 10, wherein the trend analysis comprises sentiment analysis for a topic over the second range of time.

13. The computer program product of claim 12, in which the trend analysis further comprises theme analysis for the topic, and sentiment analysis and the theme analysis are reviewed in conjunction with each other.

14. The computer program product of claim 10, in which the latent semantic analysis analyzes contextual and semantic significance of terms that appear within the social media data.

15. The computer program product of claim 10, wherein semantic filtering further comprises reducing at least one of an occurrence of false positives, false negatives, inappropriate responses, or inappropriate rejections within the one or more items.

16. The computer program product of claim 10, wherein the one or more items are supplied to an enterprise software system and the set of rules identifying how repective items of the one or more items should be handled or directed within an organization.

17. The computer program product of claim 16, wherein the enterprise software system comprises at least one of a customer relations management ("CRM") application, enterprise resource planning ("ERP") application, and supply chain management application.

18. The computer program product of claim 10, the method further comprising:
displaying the trend analysis results within a graphical user interface on a display screen;
receiving a user input to manipulate a pointing object in the graphical user interface;
filtering to reduce occurrences of false positives, false negatives, irrelevant data or inappropriate responses, the filtering comprising at least semantic filtering;
storing the trend analysis results in an electronic database on one or more persistent computer readable storage devices;

wherein latent semantic analysis analyzes contextual and semantic significance of terms that appear within the social media data;

wherein volume analysis and sentiment analysis are reviewed in conjunction with each other; and wherein the workflow engine is part of an enterprise software system comprising at least one of a customer relations management application, enterprise resource planning applications, and a supply chain management application, the one or more items comprising at least one of identification of sales leads, identification of customer relations issues, or identification of dissatisfied customers.

19. A computer system for analyzing social media data to identify one or more trends and perform trend analysis on a portion of the social media data representing a range of time, comprising:

a computer processor to execute a set of instructions; and a memory to hold the set of instructions, in which the set of instructions comprises instructions to perform:

analyzing a portion of the social media data using an analysis unit, the analysis unit being communicatively coupled to receive inputs from one or more online social data sources and to provide analysis outputs to a workflow engine, the analysis unit generating trend analysis for the portion of the social media data, the analysis of the portion of the social media data performed by a process comprising:

receiving social media data from the one or more online social data sources transmitted over one or more electronic communication links, the social media data representing a first range of time, performing latent semantic analysis on a portion of the social media data to identify themes within the social media data, the portion of the social media data comprising some or all of the social media data and representing a second range of time, performing semantic filtering to remove content from within the social media data resulting in a reduction of the social media data that is to be clustered, clustering at least some of the portion of the social media data into one or more clusters by classifying the social media data based on at least the themes identified as a result of the latent semantic analysis, and performing trend analysis on data from the one or more clusters over the second range of time, the trend analysis comprising both:

(1) tracking a volume of the data from the one or more clusters over the second range of time, and (2) performing sentiment analysis on the volume of the data from the one or more clusters over the second range of time;

processing trend analysis results using the workflow engine, the workflow engine processing the trend analysis results using a set of rules provided in a rulebase, the trend analysis results processed by:

receiving the trend analysis results from the analysis unit transmitted over one or more electronic communication links, identifying one or more items based at least in part on the trend analysis results; and automatically processing at least some of the one or more items by identifying a first rule from the set of rules for determining whether to create an electronic message, the electronic message being sent over the one or more electronic communication links to a specific destination based at least on a second rule from the set of rules, the second rule corresponding to identifying the specific destination for the electronic message.

20. The computer system of claim 19, wherein the trend analysis comprises theme analysis corresponding to consumer interest over the second range of time and determining the volume and sentiment of the data from the one or more clusters over the second range of time.

21. The computer system of claim 19, wherein the trend analysis comprises sentiment analysis for a topic over the second range of time.

22. The computer system of claim 21, in which the trend analysis further comprises theme analysis for the topic, and sentiment analysis and the theme analysis are reviewed in conjunction with each other.

23. The computer system of claim 19, in which the latent semantic analysis analyzes contextual and semantic significance of terms that appear within the social media data.

24. The computer system of claim 19, wherein semantic filtering further comprises reducing at least one of an occurrence of false positives, false negatives, inappropriate responses, or inappropriate rejections within the one or more items.

25. The computer system of claim 19, wherein the one or more items are supplied to an enterprise software system and the set of rules identifying how respective items of the one or more items should be handled or directed within an organization.

26. The computer system of claim 25, wherein the enterprise software system comprises at least one of a customer relations management ("CRM") application, enterprise resource planning ("ERP") application, and supply chain management application.

27. The computer system of claim 19, wherein the set of instructions further comprise instructions to perform:

displaying the trend analysis results within a graphical user interface on a display screen;

receiving a user input to manipulate a pointing object in the graphical user interface;

filtering to reduce occurrences of false positives, false negatives, irrelevant data or inappropriate responses, the filtering comprising at least semantic filtering;

storing the trend analysis results in an electronic database on one or more persistent computer readable storage devices;

wherein latent semantic analysis analyzes contextual and semantic significance of terms that appear within the social media data;

wherein volume analysis and sentiment analysis are reviewed in conjunction with each other; and wherein the workflow engine is part of an enterprise software system comprising at least one of a customer relations management application, enterprise resource planning applications, and a supply chain management application, the one or more items comprising at least one of identification of sales leads, identification of customer relations issues, or identification of dissatisfied customers.

* * * * *

UNITED STATES PATENT AND TRADEMARK OFFICE
CERTIFICATE OF CORRECTION

PATENT NO. : 10,909,550 B2
APPLICATION NO. : 13/795802
DATED : February 2, 2021
INVENTOR(S) : McCandless et al.

Page 1 of 1

It is certified that error appears in the above-identified patent and that said Letters Patent is hereby corrected as shown below:

In the Specification

In Column 7, Line 41, delete "PTSN," and insert -- PSTN, --, therefor.

In the Claims

In Column 9, Line 7, in Claim 7, delete "repective" and insert -- respective --, therefor.

In Column 9, Line 14, in Claim 9, delete "comprising" and insert -- comprising: --, therefor.

In Column 10, Line 49, in Claim 16, delete "repective" and insert -- respective --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*